United States Patent Office 2,972,611
Patented Feb. 21, 1961

2,972,611

FLUORESCENT TRIAZOLYL STILBENE COMPOUNDS

Reinhard Zweidler, Basel, and Ernst Keller, Binningen, Basel Land, Switzerland, assignors to J. R. Geigy A.-G., Basel, Switzerland, a Swiss firm No Drawing. Filed Aug. 19, 1957, Ser. No. 679,083

Claims priority, application Switzerland Sept. 6, 1956

7 Claims. (Cl. 260—240)

The invention concerns blue fluorescent 4.5-arylene-1.2.3-triazole stilbene compounds which are soluble in organic solvents and which are suitable for the brightening of almost white, hydrophobic organic substances in daylight. It also concerns processes for the production of the new fluorescent triazolyl stilbene compounds as well as their use for the brightening of hydrophobic organic material such as fats, waxes, paraffines and also polymeric and polycondensed synthetic materials such as polyethylene, polyvinyl chloride, polyacrylonitrile, polyvinylidene chloride, polystyrol, copolymers of these and similar compounds, resins and lacquers, polyesters, polyamides and polyurethanes, by producing solid solutions thereof in these substances or by incorporating solutions thereof in other organic solvents in these substances. Finally, the invention concerns, as industrial product, the material brightened with the aid of these triazolyl stilbene compounds.

In U.S. Patent No. 2,784,184, organically soluble triazolyl stilbene compounds are described which are distinguished by a strong fluorescence in liquid or solid organic solution and which are therefore suitable for the brightening of hydrophobic organic material. They are obtained from fluorescent 4-(4.5-arylene-1.2.3-triazolyl-2)-stilbene sulphonic acids which contain a sulphonic acid group in an o- or p-position to the stilbene radical, by converting the acid, salt forming sulphonic acid groups into non-ionogenic sulphonic acid arylester groups, alkyl or aryl sulphonyl groups or sulphonic acid amide groups which promote solubility in organic agents, which groups are bound to the nitrogen atom direct or by way of aromatic rings with saturated aliphatic or alicyclic hydrocarbon radicals.

On further work being done on this subject it has been found that it is advantageous to replace these sulphonyl substituents which promote organic solubility and the fluorescence, by the cyano group.

Thus, the present invention concerns the production or organically soluble 4.5-arylene-1.2.3-triazolyl cyanostilbene compounds which contain no acid, salt forming groups and no colouring substituents such as chromophores or aromatically bound hydroxyl and amino groups. These compounds are produced from suitable 4-aminostilbene compounds which contain cyano substituents in an o-position to the vinylene bridge in the p-amino substituted benzene ring of the stilbene radical or in any position desired in a benzene ring of the stilbene radical having no amino groups, by diazotising the amino groups, coupling the diazo compound with a suitable azo component coupling in o-position to a primary amino group and oxidising the o-aminoazo dyestuff obtained to the corresponding 4.5-arylene-1.2.3-triazolyl-cyanostilbene compound.

Modifications of this process consist in diazotising the amino groups in the previously formed 4.5-arylene-1.2.3-triazolyl-aminostilbene compounds and replacing the diazo groups by the cyano group according to Sandmeyer's known method. In addition, inadmissible coloring substituents, e.g. chromophores such as nitro or arylazo groups or aromatically bound amino or hydroxyl groups in the 4.5-arylene-1.2.3-triazolyl-cyanostilbene compounds can be removed by chemical means or converted into admissible substituents for example by alkylating hydroxyl groups, reducing nitro and arylazo groups to amino groups, either acylating or diazotising amino groups and replacing them by known methods by hydrogen, halogen or cyanogen and coupling with an azo component coupling in a neighbouring position to a primary amino group and then oxidising the o-aminoazo dyestuff to the 4.5-arylene-1.2.3-triazole-2-yl substituent. Also 4 - [5-amino-1.2.3-benztriazolyl-2] - cyanostilbene compounds can be coupled with aromatic diazo compounds and the o-aminoazo dyestuff obtained oxidised to the 4-[2-aryltriazolo-benztriazolyl]-cyanostilbene compound.

The compounds according to the present invention correspond to the general formula:

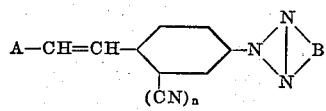

wherein

A represents an aromatic carbocyclic radical which contains at most two rings,

B represents an aromatic carbocyclic radical containing at most three condensed rings and in which two vicinal carbon atoms of a six-membered aromatic ring form part of the 1.2.3-triazole ring, n is one of the numerals 0 and 1, and when n is 0, A contains a cyano group, the aromatic nuclei being free from chromophores and ionogenic substituents. The radical B in the above formula is represented in particular by benzene radicals such as alkoxy-alkyl phenylenes, dialkoxy phenylenes, acylamino phenylenes and halogen alkoxy phenylenes and by radicals of an isocyclic condensed ring system which ring system is bound in the 1.2-position of a naphthylene radical with the nitrogen atom of the triazole ring and which may contain no further fused aromatic rings. In the latter case however, the isocyclic condensed ring system may contain fused hydrogenated rings so that, for example, B can represent naphthylene and acenaphthenylene radicals.

4-amino-cyanostilbene compounds suitable for the process according to the present invention are obtained according to the Ullmann method (Berichte der deutschen chemischen Gesellschaft, vol. 41, page 2296) by condensing 4-nitro-2-cyano-1-methylbenzene with benzaldehydes which can still be further substituted non-ionogenically, e.g. by halogen, alkyl, phenyl, alkoxy, phenoxy, acylamino groups and which also can contain fused benzo radicals which, as listed above, can be non-ionogenically further substituted, to the corresponding 4-nitrostilbene compounds. Other 4-nitrocyanostilbene compounds which can be used are obtained by coupling diazotised p-nitranilines with cyano cinnamic acids while splitting off nitrogen and carbon dioxide and by condensing 4-nitrophenyl acetic acids with cyanobenzaldehydes while splitting off carbon dioxide. In these 4-nitrostilbene compounds, the nitro group is then reduced to the amino group, e.g. in organic/aqueous solution according to Béchamp's method.

The 4-amino-cyanostilbene compounds are diazotised advantageously in organic/aqueous solution, e.g. advantageously in aqueous dimethyl formamide with hydrochloric acid and alkali nitrite.

Suitable solvents for use in the coupling reaction with the azo components coupling in o-position to a primary amino group are tertiary nitrogen bases, advantageously pyridine bases.

Compounds of the benzene and naphthalene series coupling in the neighbouring position to the amino group are used as coupling components. Advantageously aminonaphthalene compounds coupling in the neighbouring position to the amino group are used which can be further substituted within the bounds of the definition, e.g. 2-aminonaphthalenes with a free or sulphonated 1-position which can also contain halogen, alkyl, alkoxy and acylamino groups, also 1-aminonaphthalene compounds the 2-position of which is free and the 4-position is occupied or hindered by a neighbouring negative group, e.g. 1-amino-4-alkyl-naphthalenes such as 1-amino-4-methyl naphthalene; 1-amino-4.5-alkylene naphthalenes such as 5-aminoacenaphthene, 6-chloro- or 6-alkoxy-5-amino-acenaphthenes; 1-amino-4-alkoxynaphthalenes such as 1-amino-4-methoxy naphthalene; 1-amino-5.8-dichloronaphthalene, 1-aminonaphthalene-5-alkyl sulphones or 1-aminonaphthalene-5-sulphonic acid alkyl or dialkyl or cycloalkyl amides. 1.3-diaminobenzene, 1.3-diamino-4-halogen benzenes, 1.3-diamino-4-alkoxybenzenes, 1.3-diamino-4-alkyl- or aryl sulphonyl benzenes, 1-amino-3-alkoxy-4-alkylbenzenes, 1-amino-3-alkoxy-4-halogen benzenes, 1-amino-3.4-dialkoxybenzenes are coupling components of the benzene series which can be used.

The o-aminoazo dyestuffs which are generally insoluble in water are oxidised advantageously in organic solvents which are stable to oxidation and which can be mixed with water. It is also advantageous to use solutions in pyridine bases. The usual oxidising agents can be used, e.g. cupric salts or alkali hypohalites. The 4.5-arylene-1.2.3-triazolyl-cyanostilbene compounds according to the present invention are purified advantageously from organic or organic/aqueous solvents with the addition of reducing agents such as sodium hydrosulphite.

In a pure state, they are generally pale yellowish to brownish coloured, water insoluble powders which dissolve colourlessly in organic solvents, in particular in the organic solvents used in the plastics industry as plasticisers. The solutions have an intensive violet-blue, blue to green-blue fluorescence. Incorporated in this form into polymeric synthetic substances they give the latter a greatly improved white appearance. They are also suitable for the brightening of polyester fibres such as alkylene glycol terephthalates. Because of their easy technical accessibility on the one hand and also the particularly favourable blue fluorescence light on the other, the naphtho-1'.2':4.5-1.2.3-triazolyl compounds are to be preferred; the same is true of the 4-triazolyl-2-cyanostilbene compounds.

Further details can be seen from the following examples which illustrate the invention without limiting it in any way. Where not otherwise stated, parts are given as parts by weight. The temperatures are in degrees centigrade. The relationship of parts by weight to parts by volume is as that of kilogrammes to litres.

*Example 1*

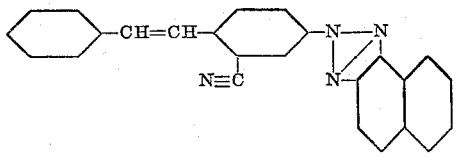

The solution of 22.0 parts of 4-amino-2-cyanostilbene in 50 parts of dimethyl formamide, with the addition of 200 parts of water, 100 parts of ice and 25 parts of concentrated hydrochloric acid, is diazotised at 5–8° with an aqueous solution of 6.9 parts of sodium nitrite. The diazo compound is coupled at 7–10° with 14.3 parts of 2-aminonaphthalene in 500 parts of technical pyridine. On completion of the coupling, 8 parts of sodium hydroxide and then excess sodium chloride are added. The pyridine solution of the dyestuff is extracted and 200 parts of ice and 5 parts of sodium hydroxide in 100 parts of water are added. An aqueous solution of 170 parts of sodium hypochlorite (about 17%) is then added dropwise within 30 minutes. After stirring for several hours, the temperature is raised to 85–90°. 6 parts of sodium hydrosulphite are then added and the pyridine is distilled off with steam. The crude product which precipitates is filtered off warm and washed well with warm water. It is purified by dissolving in 50% dimethyl formamide water mixture and precipitating with 10% sodium chloride solution. The product so purified is dried at 50–60°. 2-[2''-cyanostilbyl-4'']-(naphtho-1'.2':4.5)-1.2.3-triazole is obtained, recrystallised from chlorobenzene, as a pale yellowish powder which melts at 225–227° (uncorrected). It is not soluble in water but is so in many organic solvents such as dimethyl formamide, pyridine, chlorobenzene, ethyl acetate.

The compound is a valuable brightening agent for various synthetic fibres such as superpolyamides and superpolyurethanes. It can be used also for the brightening of organic synthetic materials such as vinyl or vinylidene polymers, copolymers, polyester resins, polystyrols, polyethylene etc.

Compounds having similar properties are obtained if in the above example the 2-aminonaphthalene is replaced by 17.3 parts of 2-amino-5-methoxynaphthalene or 17.3 parts of 2-amino-6-methoxynaphthalene or by 17.3 parts of 2-amino-7-methoxynaphthalene and otherwise the same procedure is followed. Recrystallised from chlorobenzene 2-[2''-cyanostilbyl-4'']-(5'- or -6'- or -7'- methoxynaphtho-1'.2':4.5)-1.2.3-triazole is obtained as a yellowish powder. The melting points are 248–250°, 260–263° and 204–206° respectively (uncorrected).

All these products are brightening agents for organic substances of the types mentioned.

*Example 2*

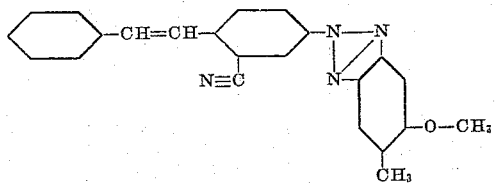

22.0 parts of 4-amino-2-cyano-stilbene are diazotised as described in Example 1 and coupled at 7–10° with a solution of 13.7 parts of 1-amino-4-methyl-5-methoxybenzene in 500 parts of technical pyridine. On completion of the coupling, caustic soda lye corresponding to 5 parts of sodium hydroxide and excess sodium chloride are added and the pyridine layer containing the dyestuff is separated. It is oxidised as described in Example 1 in the presence of about 5 parts of sodium hydroxide with 150–170 parts of a solution of aqueous sodium hypochlorite (about 17%), whereupon the pyridine is distilled off with steam in the presence of 5 parts of sodium hydrosulphite. The crude product is purified by dissolving and allowing to crystallise from aqueous dimethyl formamide in the presence of animal charcoal and by recrystallising from boiling chlorobenzene. 6-methyl-5-methoxy-2-(2'-cyano-stilbyl-4')-1.2.3-benztriazole is obtained as a yellowish powder. M.P. 178–180° (uncorrected).

This compound also is an excellent brightening agent for synthetic fibres such as superpolyamides and superpolyurethanes, for synthetic substances such as vinyl and vinylidene polymers, copolymers, unsaturated polyester resins, polystyrol, polyethylene.

Products having very similar properties are obtained if in the above example the 1-amino-4-methyl-5-methoxybenzene is replaced by 15.75 parts of 1-amino-4-chloro-5-methoxybenzene, 15.3 parts of 1-amino-4.5-dimethoxybenzene, 12.2 parts of 4.4'-diamino-2.2'-dimethoxy diphenyl. 6-chloro-5-methoxy- or 5.6-dimethoxy-2-(2'-cyano-stilbyl-4')-1.2.3-benztriazole or 6.6-bis-[5-methoxy- 2-(2'-cyano-stilbyl-4')-1.2.3-benztriazole] is obtained as a yellowish powder, when recrystallised from chlorobenzene; all have a similar effect on polymeric synthetic materials. The melting points are 164–168°, 187–190° and 197–199° respectively (uncorrected).

Example 3

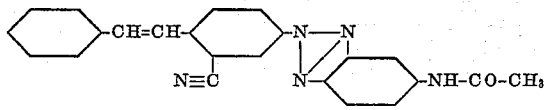

A diazo compound prepared according to Example 1 from 22.0 parts of 4-amino-2-cyano-stilbene is coupled at 3–5° with a solution of 10.8 parts of 1.3-diaminobenzene and 25 parts of crystallised sodium acetate in 500 parts of water. On completion of the coupling, the o-aminoazo dyestuff is filtered off and well washed. It is then dissolved warm in 500 parts of technical pyridine and stirred with a mixture of 60 parts of crystallised copper sulphate in 240 parts of water and 120 parts of concentrated aqueous ammonia at 95–97° until the azo dyestuff has completely disappeared. After cooling, excess sodium chloride is added, the pyridine layer is separated and washed several times with a saturated sodium chloride solution. The pyridine solution is then decomposed with excess aqueous sodium sulphide solution, some copper sulphide which precipitates is filtered off and then the pyridine is distilled off with steam in the presence of 5 parts of sodium hydroxide and 6 parts of sodium hydrosulphite. The precipitated crude product is filtered off warm, washed with warm water and dried in the vacuum at a temperature of 40–60°. On recrystallising from boiling chlorobenzene, 5-amino-2-(2'-cyano-stilbyl-4')-1.2.3-benztriazole is obtained as a cream coloured powder, M.P. 178–181° (uncorrected).

This is acetylated by refluxing 33.7 parts of this compound with 150 parts of acetic acid anhydride for 3 hours. Excess acetic acid anhydride is then decomposed by stirring with water and the crude product is filtered off. 5-acetamino-2-(2'-cyano-stilbyl-4')-1.2.3-benztriazole is obtained by dissolving the residue in aqueous dimethyl formamide in the presence of animal charcoal, precipitating by means of an aqueous sodium chloride solution (about 10%), filtering off, washing with water, drying in the vacuum at 50–60° and recrystallising from chlorobenzene. It is a yellowish-white, water insoluble powder which melts at 165–168° (uncorrected).

This product also is a valuable brightening agent for synthetic substances such as superpolyamide or superpolyurethane fibres, also for fats, oils, waxes as well as for vinyl and vinylidene polymers, copolymers, for unsaturated polyester resins, polystyrol, polyethylene etc.

A product having similar properties is obtained if 33.7 parts of 5-amino-2-(2'-cyano-stilbyl-4')-1.2.3-benztriazole in 100 parts of pyridine are reacted for 4 hours at about 95–97° with 20 parts of benzoyl chloride. Recrystallised from chlorobenzene, 5-benzoylamino-2-(2'-cyano-stilbyl-4')-1.2.3-benztriazole is obtained as a yellowish powder which is insoluble in water. M.P. 185–187° (uncorrected).

Further products with similar properties are obtained if in the above example the 1.2-diaminobenzene is replaced by 12.2 parts of 4-methyl-1.3-diaminobenzene or 13.8 parts of 4-methoxy-1.3-diaminobenzene or 14.25 parts of 4-chloro-1.3-diaminobenzene and otherwise the same procedure is followed. On recrystallising from chlorobenzene, 5-acetamino- or 5-benzoylamino-6-methyl- or -6-methoxy- or -6-chloro-2-(2'-cyano-stilbyl-4')-1.2.3-benztriazole is obtained as a yellowish to yellowish-white powder. The melting points are 160–162°, 192–195°, 165–167°, 264–266°, 260–262° and 194–197° respectively.

All these compounds are valuble brightening agents for organic compounds of the type listed.

Example 4

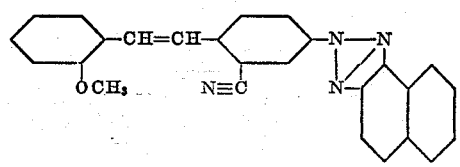

25.0 parts of 4-amino-2-cyano-2'-methoxystilbene are dissolved in 100 parts of ethylene glycol monomethyl ether, an aqueous solution of 6.9 parts of sodium nitrite is added and the whole is added dropwise to a mixture of 25 parts of concentrated hydrochloric acid, care being taken by the addition of ice that the temperature remains between 4 and 6°. The diazo compound obtained is coupled with a pyridine solution of 14.3 parts of 2-aminonaphthalene to form the o-aminoazo dyestuff as described in Example 1, and this is then oxidised with sodium hypochlorite to form the triazole compound. On recrystallising from chlorobenzene, 2 - [2''' - methoxy - 2'' - cyanostilbyl-4'']-naphtho-(1'.2':4.5)-1.2.3-triazole is obtained as a pale yellow powder. M.P. 199–201° uncorrected.

If this compound is incorporated into polymeric synthetic materials such as polyvinyl chloride, copolymers, polystyrol, polyacrylic acid ester, it gives them a much more white appearance in daylight. A compound having a similar action is obtained if in the above example, the 2-aminoanaphthalene is replaced by 13.7 parts of 1-amino-4-methyl-5-methoxybenzene. Recrystallised from chlorobenzene, 6-methyl - 5 - methoxy-2-(2''-methoxy-2'-cyanostilbyl-4'')-1.2.3-benztriazole is a yellow powder which melts at 168–171° (uncorrected).

Also, the 4-amino-2-cyano-2'-methoxystilbene can be replaced by 25.0 parts of 4-amino-2-cyano-4'-methoxystilbene and, as described above, coupled with 2-aminonaphthalene or 1-amino-4-methyl-5-methoxybenzene and converted into the corresponding triazole compound. On recrystallisation from chlorobenzene, 2-[4'''-methoxy-2''-cyano-stilbyl-4'']-(naphtho-1'.2':4.5)-1.2.3 - triazole or 6-methyl-methoxy-2-(4''-methoxy-2'-cyano-stilbyl-4')-1.2.3-benztriazole is obtained as a yellow powder. The melting points are 126–128° and 137–140° respectively (uncorrected).

By using 23.4 parts of 4-amino-2-cyano-4'-methyl-stilbene, 2 - (4''' - methyl-2''-cyano-stilbyl-4'')-(naphtho-1'.2':4.5)-1.2.3-triazole or 6-methyl-5-methoxy-2-(4''-methyl-2'-cyano-stilbyl-4')-1.2.3-benztriazole is obtained which melt at 162–166° and 148–150° respectively (uncorrected). These compounds are also yellow powders with similar optical properties.

If the 4-amino-2-cyano-2'-methoxystilbene is replaced by 26.4 parts of 4-amino-2-cyano-3'.4'-dihydroxymethylene stilbene or by 25.5 parts of 4-amino-2-cyano-2'-chlorostilbene or by 25.5 parts of 4-amino-2-cyano-4'-chlorostilbene, the diazo compound thereof is coupled with 2-aminonaphthalene and the o-aminoazo dyestuff is oxidised as described above with sodium hypochlorite, then 2-(3''''.4'''-dihydroxymethylene-2''-cyanostilbyl-4'')- or 2-(2'''-chloro-2''-cyano-stilbyl-4'')- or 2-(4'''-chloro-2''-cyano-stilbyl-4'')-(naphtho-1'.2':4.5)-1.2.3-triazole is obtained. They are all yellow powders and melt at 169–171°, 205–208°, and 200–202° (uncorrected). These compounds are brightening agents for the organic substrata already mentioned.

The diazo components used in the above example are produced according to Ullmann's method (Berichte der deutschen chemischen Gesellschaft, vol. 41, p. 2296) by condensing 1-methyl-4-nitro-2-cyano-benzene with 2-methoxy benzaldehyde or 4-methoxy benzaldehyde or 4-methyl benzaldehyde or 3.4-dihydroxymethylene benzaldehyde or 3.4-dihydroxymethylene benzaldehyde or with 2-chlorobenzaldehyde or with 4-chlorobenzaldehyde to form the corresponding 4-nitrostilbenes and reducing the nitro group to the amino group according to Béchamp

Example 5

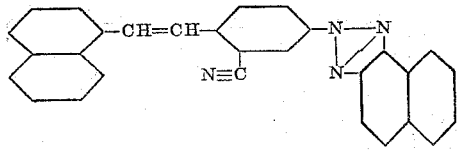

27.0 parts of 4-amino-2-cyano-2'.3'-benzostilbene are diazotised according to the method described in Example 1 and the diazo compound is coupled with 14.3 parts of 2-aminonaphthalene in 500 parts of technical pyridine. The pyridine solution of the o-aminoazo dyestuff obtained is then oxidised with 150–170 parts of an aqueous sodium hypochlorite solution (about 17%), the pyridine is distilled off with steam and the crude product is purified by dissolving and allowing to crystallise. Recrystallised from chlorobenzene 2-[2'''.3'''-benzo-2''-cyano-stilbyl-4'']-(naphtho-1'.2':4.5)-1.2.3-triazole is obtained as a yellow powder, which is insoluble in water. M.P. 232–234° (uncorrected). This compound is soluble in many organic solvents such as pyridine, ethylene glycol monomethyl ether, dimethyl formamide, chlorobenzene, dioctyl phthalate and when so dissolved it has a strong fluorescence. It is an excellent agent for the brightening of the most various organic substances, in particular polystyrols, polyethylene and unsaturated polyester resins.

The 4-amino-2-cyano-2'.3'-benzo-stilbene mentioned in the above example is produced in the following manner.

4-nitro-2-cyano-2'.3'-benzo-stilbene (obtained according to Ullmann, B.41 2296 by condensing 1-naphthaldehyde with 1-methyl-4-nitro-2-cyanobenzene) is reduced according to Béchamp with etched cast iron filings in a mixture of the ethylene glycol monomethyl ether and water to the amino compound. This compound is a yellow powder.

Example 6

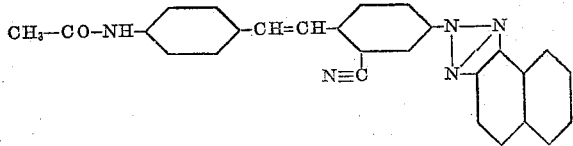

27.7 parts of 4-amino-4'-acetamino-2-cyano-stilbene are diazotised according to Example 1 in dimethyl formamide with 6.9 parts of sodium nitrite and 25 parts of concentrated hydrochloric acid. The diazo compound is coupled with a solution of 14.3 parts of 2-aminonaphthalene in 400 parts of technical pyridine, and, after the addition of sodium chloride, the o-aminoazo dyestuff is separated as a pyridine solution. A solution of 60 parts of crystallised copper sulphate in 240 parts of water is added and the whole is stirred at a temperature of 92–95° until the o-aminoazo dyestuff has completely disappeared. The reaction mixture is then cooled and 120 parts of concentrated aqueous ammonia are added at 12–15°. It is separated into two layers by stirring for a short time in the presence of excess sodium chloride and then, as described in Example 3, the pyridine layer is freed from cupric ions, the pyridine is distilled off in the presence of 5 parts of sodium hydrosulphite and the crude product is purified by dissolving and allowing to crystallise from aqueous dimethyl formamide in the presence of animal charcoal.

On recrystallisation from chlorobenzene, 2-[4'''-acetamino-2''-cyano-stilbyl-4''] - (naphtho-1'.2':4.5)-1.2.3-triazole is obtained as a yellowish powder. M.P. 254–256° (uncorrected).

This product is soluble in many organic solvents such as pyridine, ethylene glycol monomethyl ether, dimethyl formamide, chlorobenzene, dioctyl phthalate and in these solvents has a strong fluorescence. It is a valuable brightening agent for the most various organic substances, in particular for synthetic materials such as polystyrol, polyethylene, unsaturated polyester resins.

A product having similar properties is obtained if the 2-aminonaphthalene is replaced by 13.7 parts of 1-amino-4-methyl-5-methoxybenzene. After recrystallisation from chlorobenzene, 6-methyl-5-methoxy-2 - (4'''-acetamino-2'-cyano-stilbyl-4')-1.2.3-benztriazole is obtained as a yellowish powder. M.P. 238–240° (uncorrected).

The 4-amino-4'-acetamino-2-cyano-stilbene mentioned in the above example is obtained in the following manner: 4-nitro-4'-acetamino-2-cyano-stilbene (obtained according to Ullmann B.41, 2296 by condensing 4-acetamino benzaldehyde with 1-methyl-4-nitro-2-cyanobenzene) is reduced to the amino compound according to Béchamp with etched iron filings in a mixture of ethylene glycol monomethyl ether and water. This compound is obtained as a yellowish powder. M.P. 257–260° (uncorrected).

Example 7

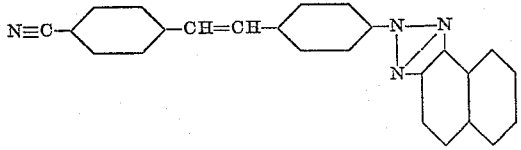

22.0 parts of 4-amino-4'-cyano-stilbene are dissolved in 100 parts of dimethyl formamide, an aqueous solution of 6.9 parts of sodium nitrite is added and the whole is indirectly diazotised at 8–10° by pouring into a mixture of water/ice and 25 parts of concentrated hydrochloric acid. The solution obtained is coupled with an aqueous solution of 11 parts of 30% hydrochloric acid and 14.3 parts of 2-aminonaphthalene and the mineral acid reaction of the mixture is buffered by the addition of crystallised sodium acetate until Congo red paper no longer turns blue. On completion of the coupling, the o-aminoazo dyestuff is filtered off, washed with water and dissolved while damp in 500 parts of technical pyridine. A solution of 60 parts of crystallised copper sulphate in 240 parts of water is added and the whole is stirred at 92–97° until the o-aminoazo dyestuff has completely disappeared. It is allowed to cool, at 12–15° 120 parts of a concentrated aqueous ammonia solution are added and then excess sodium chloride is added, the whole is stirred, the pyridine layer is separated and is washed several times with saturated sodium chloride solution with the addition of a little concentrated ammonia to remove the copper salts. The pyridine is then removed with steam, the precipitated crude product is dissolved in hot, aqueous dimethyl formamide and, after adding 5 parts of sodium hydrosulphite and some animal charcoal, it is stirred for some time, then clarified and the triazole is again precipitated from the filtrate by the addition of an aqueous solution of sodium chloride (about 10%). After washing with water, drying in the vacuum at 50–60° and recrystallising from chlorobenzene, 2 - [4''' - cyano-stilbyl - 4''] - (naphtho-1'.2':4.5)-1.2.3-triazole is obtained as a yellowish powder which melts at 160–162° (uncorrected). This product gives organic polymers a much more white appearance in daylight. It can be used, for example, for the brightening of polyvinyl chloride, polyacrylonitrile, copolymers thereof as well as of polystyrol.

A compound with similar properties is obtained if in the above example the 4-amino-4'-cyano-stilbene is replaced by the same number of parts of 4-amino-3'-cyano-stilbene. By oxidising the corresponding o-aminoazo dyestuff with sodium hypochlorite or cupric salts and recrystallising from chlorobenzene, 2-[3'''-cyano-stilbyl-4'']-(naphtho-1'.2':4.5)-1.2.3-triazole is obtained as a yellowish powder. M.P. 166–168°.

The 4-amino-4'- or -3'-cyano-stilbene used in the above example are produced as follows:

18.3 parts of 4-nitrophenyl acetic acid, 13.1 parts of 4-cyano-benzaldehyde or 3-cyano-benzaldehyde and 6.0 parts of piperidine are condensed for 4 hours at 150–160°. 4-nitro-4'-cyano-stilbene or 4-nitro-3'-cyano-stilbene is obtained as a yellow powder.

25.0 parts of 4-nitro-4'- or -3'-cyano-stilbene are reduced according to Béchamp with etched cast iron filings in a mixture of ethylene glycol monomethyl ether and water. 4-amino-4'-cyano-stilbene or 4-amino-3'-cyano-stilbene is obtained as a yellowish powder.

Example 8

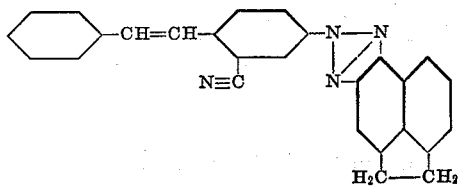

22.0 parts of 4-amino-2-cyanostilbene are dissolved in 60 parts of hot dimethyl formamide, the solution obtained is stirred with a mixture of 200 parts of ice, 100 parts of water and 25 parts of concentrated hydrochloric acid and diazotised at 5–8° with an aqueous solution of 6.9 parts of sodium nitrite. After the addition of 3 parts of a condensation product of p-amyl phenol with 20 mol of ethylene oxide, the diazo suspension is coupled at 10–13° with a solution of 17.0 parts of 5-amino-acenaphthene and 16 parts of concentrated hydrochloric acid in 800 parts of water and the strongly acid reaction of the mixture is buffered by the gradual addition of about 20 to 30 parts of crystallised sodium acetate until Congo red paper is no longer coloured blue. On completion of the coupling, the dyestuff is precipitated in the warm with sodium chloride, filtered off and washed with water. The damp o-aminoazo dyestuff is then dissolved while warming in 800 parts of technical pyridine, a solution of 60 parts of crystallised copper sulphate in 240 parts of water is added and the mixture is stirred at 90–95° until the dyestuff has completely disappeared. The reaction mixture is cooled to room temperature, 120 parts of concentrated ammonia and sodium chloride are added until saturation is reached and then the aqueous copper tetramine solution is separated from the pyridine phase. The pyridine phase is extracted several times with saturated sodium chloride solution which contains a little ammonia. 2 parts of sodium hydrosulphite are added and the pyridine is distilled off with steam. The crude triazole is filtered off, washed with water and extracted warm with an aqueous solution of dimethyl formamide (about 50%) to remove the dark coloured side products. The residue is dried, dissolved in hot dimethyl formamide and the solution obtained is poured into 4 to 5 times its volume of a 10% aqueous solution of sodium chloride. The triazole which precipitates is filtered off, washed well with water and dried in the vacuum. For further purification, the product is recrystallised from boiling chlorobenzene. 2-[2"-cyanostilbyl-4"]-(acenaphtheno-4'.5':4.5) - 1.2.3-triazole is obtained as a yellow powder which melts at 242–245° (uncorrected).

This compound is an excellent brightening agent for the most different synthetic fibres such as superpolyamides and superpolyurethanes, in particular for "Dacron" produced by E. I. du Pont de Nemours, Wilmington, Delaware. It can also be used for the brightening of organic synthetic materials such as polymers of vinyl chloride, vinylidene chloride as well as copolymers thereof with other olefines, polystyrols, polyethylenes etc.

If, in the above example, the 4-amino-2-cyanostilbene is replaced by 25.5 parts of 4-amino-2-cyano-2'-chlorostilbene or by 25.5 parts of 4-amino-2-cyano-4'-chlorostilbene or by 23.4 parts of 4-amino-2-cyano-4'-methylstilbene, the diazo compound obtained is coupled as described above with 5-amino-acenaphthene and the o-aminoazo dyestuff is oxidised in the same manner to form the triazole compounds, then 2-[2"'-chloro-2"- cyanostilbyl-4"], or 2-[4"'-chloro-2"-cyanostilbene-4"]- or 2-[4"'-methyl-2" - cyanostilbyl - 4"] - (acenaphtheno-4'.5':4.5)-1.2.3-triazole is obtained as a yellow powder. After recrystallisation from chlorobenzene, these compounds melt at 256–258°, 261–264° or 227–230° respectively (uncorrected).

These compounds also are valuable brightening agents for the most different synthetic materials and synthetic fibres such as polystyrol, polyethylene, vinyl and vinylidene polymers, copolymers, superpolyamides and superpolyurethanes.

Example 9

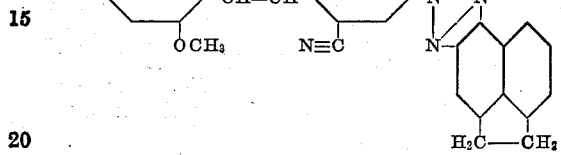

25.0 parts of 4-amino-2-cyano-2'-methoxystilbene are dissolved in 60 parts of hot dimethyl formamide and, after the addition of 150 parts of ice, 75 parts of water and 25 parts of concentrated hydrochloric acid, the solution is diazotised at 5–8° with an aqueous solution of 6.9 parts of sodium nitrite. The diazo suspension is coupled with an aqueous solution of 17.0 parts of 5-amino-acenaphthene and 16 parts of concentrated hydrochloric acid. The mineral acid reaction of the mixture is buffered by the gradual addition of about 20–30 parts of crystallised sodium acetate until Congo red paper is no longer coloured blue. On completion of the coupling, the dyestuff is isolated, dissolved warm in 600 parts of technical pyridine and stirred as described in Example 1 with an aqueous solution of 60 parts of crystallised copper sulphate at a temperature of 90–95° until the o-aminoazo dyestuff has completely disappeared. The reaction mixture is cooled, 120 parts of concentrated ammonia are added and then separated into two phases by the addition of sodium chloride until saturation is reached. The pyridine layer is separated and, in the presence of 3 to 5 parts of sodium hydrosulphite, the pyridine is distilled off with steam. The crude triazole is purified by dissolving and reprecipitating with dimethyl formamide and recrystallising from boiling chlorobenzene. 2-[2"'-methoxy-2"-cyanostilbyl-4"]-(acenaphtheno-4'.5':4.5)-1.2.3-triazole is obtained as a yellow powder which melts at 227–229° (uncorrected).

This compound is an excellent brightening agent for the most varied types of organic synthetic materials such as polymers of vinyl chloride, vinylidene chloride, copolymers, polystyrol, polyethylene, superpolyamides, superpolyethanes ect.

Compounds having similar properties are obtained if, in the above example, the 4-amino-2-cyano-2'-methoxystilbene is replaced by either 25.0 parts of 4-amino-2-cyano-4'-methoxystilbene or by 26.4 parts of 4-amino-2-cyano-3'.4'-dioxymethylene stilbene, the diazo compounds thereof are coupled with 5-amino-acenaphthene as described above and the dyestuff obtained is oxidised with cupric ions to form the triazole compounds. 2-[4"'-methoxy-2" - cyanostilbyl - 4"]-, or 2-[3"'.4"'-dioxymethylene-2"-cyanostilbyl - 4"] - acenaphthene-4'.5':4.5)-1.2.3-triazole, recrystallised from chlorobenzene, is obtained as a yellow powder. The melting points are 258–260° and 259–261° respectively (uncorrected).

Example 10

0.1 part of 2-[2"-cyano-stilbyl-4"]-(naphtho-1'.2':4.5)-1.2.3-triazole obtained according to Example 1 are stirred in 50 parts of dioctyl phthalate and then 100 parts of polyvinyl chloride powder as well as 2 parts of di-n-butyl dilauroyl dioxystannate and 0.3 part of a product of the probable constitution of penta-octyl tripolyphosphate sodium salt are mixed in. The homogenous mixture of these products is then gelatinised on a set of hot mixing rollers at 150–160° for 15 minutes and is then rolled out into foils. Polyvinyl chloride foils so produced have a considerably more white appearance in daylight than corresponding sheets prepared without the addition of the brightening agent named. The compounds described in Examples 1 to 9 have a similar effect.

Example 11

100 parts of polystyrol powder are mixed with 0.003 part of 2-[2″-cyano-stilbyl-4″]-(naphtho-1′.2′:4.5)-1.2.3-triazole obtained according to Example 1 and the mixture is then made homogenous on a set of mixing rollers at 130°. The hard plate obtained is crushed and the product is worked up in the injection moulding machine or in presses. Compared with products containing no brightening agents, the material so produced has a considerably more white appearance in daylight. The other compounds described in Examples 1–9 have a similar effect.

Example 12

10 parts of pale yellowish Dacron material are dyed for 30 minutes at an inner temperature of 98–100° in a dyebath (liquor ratio 1:40) containing 0.002 part of 2-[2″-cyano-stilbyl-4″]-naphtho-1′.2′:4.5)-1.2.3-triazole described in Example 1. The dye liquor is produced by dissolving the brightening agent in 2 parts of dimethyl formamide, mixing this solution while stirring well with one of 0.4 part of dodecyl alcohol polyglycol ether in 10 parts of water and bringing to the required volume with water. On completion of the dyeing, the goods are rinsed in cold water and dried in the air. Material so treated has a more white appearance in daylight than untreated material.

What we claim is:

1. A cyanostilbyl triazole compound of the formula:

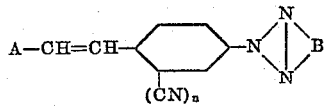

wherein

A represents a member selected from the group consisting of phenyl, lower alkylphenyl, lower alkoxyphenyl, methylenedioxyphenyl, cyanophenyl, chlorophenyl, lower alkylcarbonylaminophenyl and naphthyl, B represents an aromatic carbocyclic radical containing at most three condensed rings and being selected from the group consisting of phenylene, lower alkylphenylene, lower alkoxyphenylene, chlorophenylene, lower alkylcarbonylaminophenylene, naphthylene, lower alkoxynaphthylene and acenaphthylene, and in which two vicinal carbon atoms of a six-membered aromatic ring are bound to the nitrogen atoms of the 1.2.3-triazole ring, $n$ is a numeral from 0 to 1, and when $n$ is 0, A contains a cyano group, the aromatic nuclei being free from chromophores and ionogenic substituents.

2. A cyanostilbyl triazole compound of the formula:

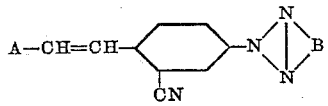

wherein

A represents phenyl,

B represents naphthylene in which two vicinal carbon atoms are bound to the nitrogen atoms of the 1.2.3-triazole ring, the aromatic nuclei being free from chromophores and ionogenic substituents.

3. A compound of the formula:

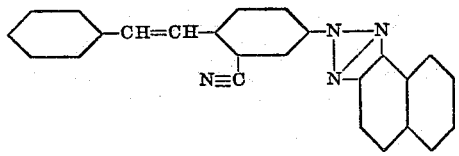

4. A compound of the formula:

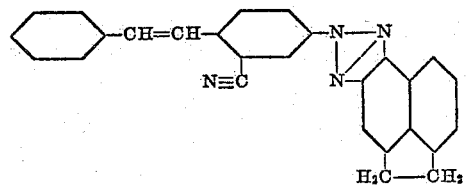

5. A compound of the formula:

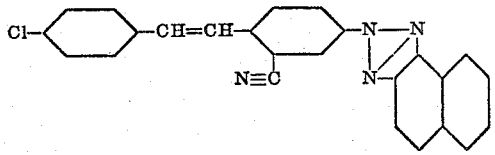

6. A compound of the formula:

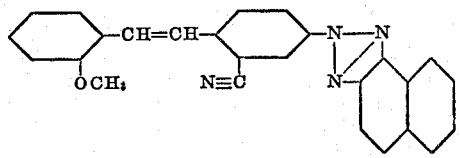

7. A compound of the formula:

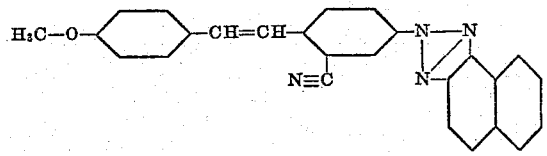

References Cited in the file of this patent

UNITED STATES PATENTS

| | | |
|---|---|---|
| 2,784,183 | Keller | Mar. 5, 1957 |
| 2,865,916 | Letvitt et al. | Dec. 23, 1958 |

FOREIGN PATENTS

| | | |
|---|---|---|
| 200,143 | Austria | Oct. 25, 1958 |
| 1,052,405 | Germany | Mar. 12, 1959 |

OTHER REFERENCES

Neblette: Photography, 4th ed., p. 348, Van Nostrand and Co. (1943).